United States Patent [19]

Robbins

[11] 4,452,372

[45] Jun. 5, 1984

[54] CLOSURE SAFETY DEVICE

[75] Inventor: Gary B. Robbins, Houston, Tex.

[73] Assignee: Modco Industries, Incorporation, Conroe, Tex.

[21] Appl. No.: 511,899

[22] Filed: Jul. 8, 1983

[51] Int. Cl.³ ............................................. B65D 45/00
[52] U.S. Cl. ................................................ 220/316
[58] Field of Search ............... 220/316, 367, 303, 327, 220/DIG. 20, 298, 30; 138/31; 137/192

[56] References Cited

U.S. PATENT DOCUMENTS 4,122,969 10/1978 Hughey ................................ 220/316
4,367,823 1/1983 Raver .................................. 220/316

Primary Examiner—George T. Hall
Attorney, Agent, or Firm—Gunn, Lee & Jackson

[57] ABSTRACT

A pressure activated safety device includes a body structure defining an internal chamber having a partition movably disposed within the chamber. Pressure from a pipeline, pressure vessel, etc., acts upon the partition and positions it at a locking position preventing a venting seal from being released. A seal releasing element is movable relative to the body structure and is manually forced into an unlocking position against the bias of pressure acting upon the partition. The partition is pressure responsive such that it is manually movable from the locking position only upon the occurrence of a negligible pressure condition within the pressure chamber, thus providing for movement of a mechanical object only under an internal pressure condition that renders the apparatus safe.

20 Claims, 4 Drawing Figures

U.S. Patent  Jun. 5, 1984  4,452,372
FIG.1
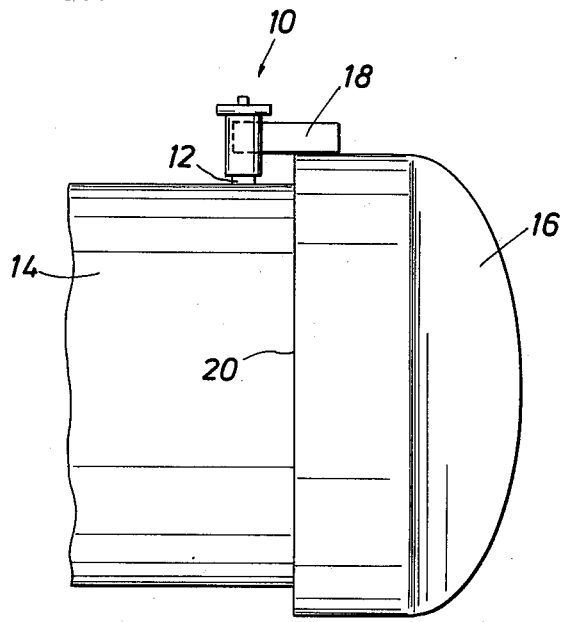
FIG.2
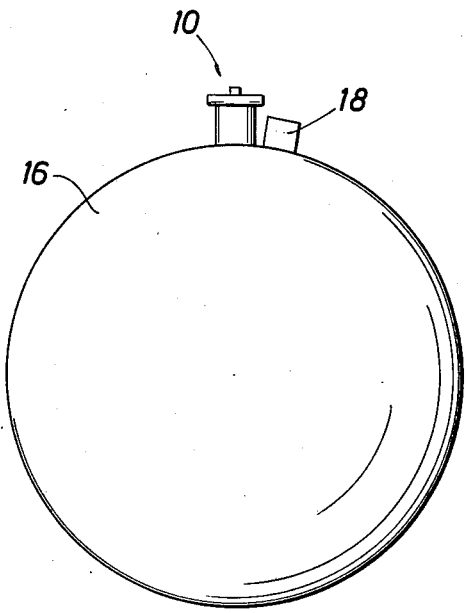
FIG.3
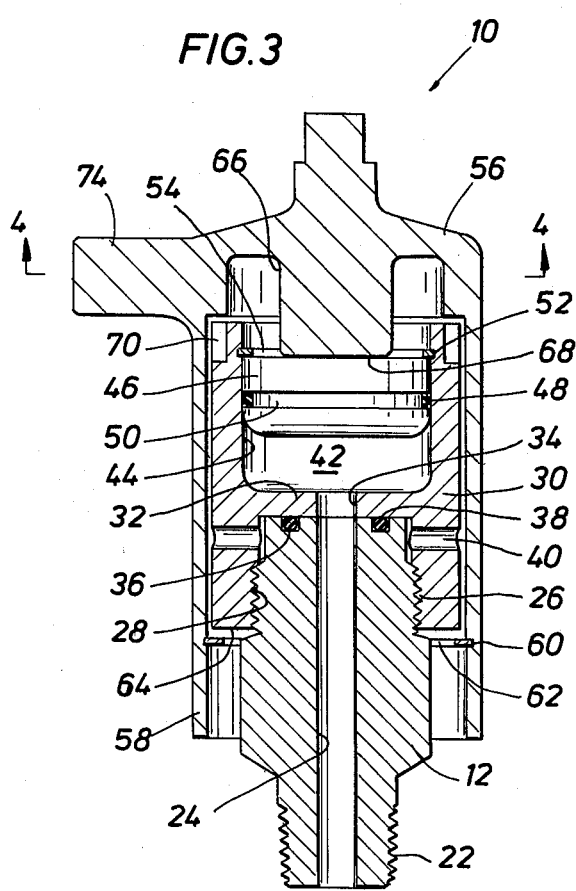
FIG.4

4,452,372

CLOSURE SAFETY DEVICE

FIELD OF THE INVENTION

This invention is related generally to safety devices for the protection of workers from the hazards of pressure containing vessels, such as pipelines, pressure-containing tanks and the like. More specifically, the present invention is directed to a pressure-actuated safety device for mechanical objects such as closures for pipelines and pressure vessels wherein the closures are capable of manual opening only under circumstances where the internal pressure thereof is zero or sufficiently negligible as to permit safe opening of the closure. Even more specifically, the present invention relates to a pressure activated safety device that functions as a mechanical stop to prevent inadvertent opening of a closure of a pressure containing vessel and permits manual inspection of the pressure condition of the vessel without release of the pressurized contents of the vessel to the atmosphere.

BACKGROUND OF THE INVENTION

Many pressure containing vessels such as pipelines, pressurized tanks and the like are provided with closure devices that provide access thereto. In some cases the pressurized gaseous contents of the pressure vessel can represent a hazard to workers should the contents be vented to the atmosphere. In most cases, the physical properties of pressure vessel closures are such that it is relatively impossible for workers to open the closure while the pressure vessel is maintained under pressure of significantly high value. Where the closure is quite large (as for example, pipelines having 36" diameters), pressure induced forces developed by minimal or nominal pressure conditions can subject workers to physical injury in the event of sudden venting of the closure under pressure.

In many cases closures for pipelines, pressure vessels and the like are of the quick-opening type, thus allowing them to opened by minimal rotation such as a partial or single revolution for low pressure vessels or a minimal number of revolutions for high pressure vessels. In these cases, it is highly desirable that workers be aware of the pressure conditions of the vessel prior to opening the closure. It is therefore desirable to provide a safety device for the closures of pressure containing vessels to thus insure that opening of the closure can be accomplished only when the internal pressure of the vessel is of sufficiently neglible nature that pressure-induced force acting on the closure is at a safe level that workers are not endangered.

In many cases, the product contained within the pressure vessel is of sufficiently hazardous nature to workers in and about the area thereof, it is imperative that the product be prevented from any release into the atmosphere. For example, large gas pipelines may control the flow of sour gas containing high percentages of hydrogen sulfide which is well known to be hazardous to workers. It is desirable therefore to provide a pressure actuated safety device for the closures of pipelines, pressure vessels and the like, wherein workers may manually inspect the internal pressure condition of the pipeline or pressure vessel without releasing any of the hazardous gaseous material into the atmosphere where it might constitute a danger to the workers. Although the present invention is direted primarily to safety for gas handling systems, such is not intended to limit the spirit and scope of the invention. The safety device disclosed herein may also be employed in liquid handling systems as well.

In many cases, closures for various pressure vessels are provided having venting devices to ensure that the vessel contains no pressure prior to opening of the closure. These venting-type safety devices are impractical under circumstances where the product within the pressure vessel constitutes a hazard to workers involved. It is thus desirable to ensure that workers have the capability of efficiently and safely controlling the opening and closing movement of the closures of pressure vessels under circumstances that ensure against the venting of any hazardous constituents into the atmosphere.

SUMMARY OF THE INVENTION

It is therefore a primary feature of the present invention provide a novel pressure activated safety device for the closures of pipelines, pressure vessels and the like wherein the internal pressure condition of the pressure vessels involved may be manually inspected to ensure the presence of a safe internal pressure condition prior to opening of the closures.

It is an even further feature of this invention to provide a pressure activated safety device for the closures of pipelines and pressure vessels which serves as a mechanical stop to prevent the unlocking or unthreading of the closure under circumstances where the internal pressure is above a predetermined neglible level.

Briefly, the present invention concerns a pressure activated safety device including a body nipple which is threaded into the structure adjacent to a closure device and which defines a passage transmitting pressure from the pipeline or pressure vessel into a pressure chamber. The pressure chamber is defined by an outer portion of the body structure. The outer body structure and the body nipple cooperate to define a sealed chamber retaining a sealing element such as a body O-ring which prevents communication of the pressure chamber with the atmosphere.

Within the pressure chamber is provided a movable wall structure which may conveniently take the form of a free-floating piston or a yieldable diaphragm. The movable partition is responsive to pressure within the pressure chamber and is urged by pressure induced force to a locking position. An outer housing or cover is provided which is retained by the body and is movable relative to the body by both linear and rotary movement. Detents are provided within the unlocking cover which are received by detent receptacles or keyways formed on the upper body structure. Within the outer body housing is provided a partition displacement element which, in the locking position of the partition, is engaged to position the outer housing at a locking position, whereby the detents of the outer housing are positioned out of registry with the detent receptacles or keyways. In this position of the outer housing, it is impossible to rotate the outer housing and to also induce rotation to the inner body structure. The force of pressure acting upon the partition prevents the outer housing from being moved to its releasing position where the detents are received within the detent receptacles. Upon dissipation of the pressure condition within the pipeline or pressure vessel, the pressure within the piston chamber of the safety device is consequently also diminished thus minimizing the pressure induced force acting upon the partition. When this pressure induced force is of neglible force, operating personnel will simply apply manual pressure to the outer housing structure thus moving the partition and housing to the releasing position thereof. With the detents in engagement with the detent receptacles rotational force may be manually applied through the outer housing structure to thereby accomplish rotation of the upper portion of the inner housing. When this is accomplished, the body seal between the body nipple and body housing will be released to thus provide further evidence that the pressure condition within the pipeline or pressure vessel is zero or at a neglible value. With the pressure condition of the pipeline or pressure vessel thus confirmed, operating personnel then will remove the inner and outer housings in unitary forms, leaving the support body section in place. Since the support body section is of limited height, the closure interference block or arms of the closure will pass over it, permitting the worker to manipulate the closure device to its open condition rotational unthreading movement.

BRIEF DESCRIPTION OF THE DRAWINGS

So that the manner in which the above recited features, advantages and objects of the present invention, as well as others, which will become apparent, are attained and can be understood in detail, a more particular description of the invention, briefly summarized above, may be had by reference to the embodiment thereof which is illustrated in the appended drawings, which drawings form a part of this specification. It is to be noted, however, that the appended drawings illustrate only a typical embodiment of the invention and are therefore not to be considered limiting of its scope, for the invention may admit to other equally effective embodiments.

In the drawings:

The present invention, both as to its organization and manner of operation, together with further advantages thereof may best be understood by way of illustration and example of a certain embodiment when taken in conjunction with accompanying drawings in which:

FIG. 1 is a partial side elevational view of a pipeline or pressure vessel sub having a closure member affixed thereto and illustrating a pressure activated safety device constructed in accordance with the present invention positioned to block unthreading of the closure member.

FIG. 2 is an end view of the structure set forth in FIG. 1 further illustrating the relationship of the closure safety device to the closure member and to a closure interference block connected to the closure.

FIG. 3 is a sectional view of a pressure activated safety device constructed in accordance with the present invention and showing the various components thereof in the pressure energized locking positions thereof.

FIG. 4 is a sectional view taken along line 4—4 of FIG. 3.

DETAILED DESCRIPTION OF PREFERRED EMBODIMENT

Referring now to the drawings and first to FIG. 1, a pressure energized safety device is illustrated generally at 10 which is constructed in accordance with the present invention. The safety device 10 is shown to be secured by a support nipple body 12 within an internally thread opening formed in a pipeline sub 14. A closure device 16 is provided for the pipeline sub and is threaded into assembly with the sub by means of acme threads, not shown. The closure may also be provided with any other type of rotationally controlled closure connection system without departing from the spirit or scope thereof. From the closure device 16 extends an interference block or arm 18 which is welded or otherwise fixed to the closure member. The interference block 18 extends a sufficient distance beyond the rim or edge 20 of the closure that it will come into contact with the safety device 10 upon rotation of the closure, if the safety device has not been conditioned for opening of the closure. The safety device is therefore a mechanical stop which prevents rotational opening movement of the closure until a safe pressure condition has been established.

Referring now to FIG. 3, the pressure activated safety device may conveniently take the form shown where the connection nipple 12 is formed to define a lower threaded extremity 22 which is received by an internally threaded opening formed in the closure sub 14. The connection nipple 12 also forms an internal passage 24 for conducting pressure from the pipeline or pressure vessel. The connection nipple 12 further defines an externally threaded extremity 26 which is received by the internally threaded extremity 28 of an inner body housing 30. Intermediate the extremities of the inner body housing is formed a transverse wall 32 having a central aperture 34 formed therein which is disposed in the registry with the pressure transmitting passage 24. The wall 32 forms a planar sealing surface on one side thereof. The support nipple 12 is also formed to define an annular seal groove 36 within which is received an O-ring elastomeric sealing member 38 which establishes sealing engagement with the sealing surface of the transverse wall structure 32. The seal member 38 functions to seal the pressure-transmitting passage 24 with respect to the atmosphere or other external environment. The inner body housing structure 30 defines a plurality of vent passages 40 through which pressure may be relieved if desirable.

The inner body housing structure 30 is also formed internally to define a pressure chamber 42 having a cylindrical sidewall 44 defining a sealing surface. Within the pressure chamber 42 is disposed a movable partition member 46 which in FIG. 3 is shown as a free-floating piston member. The piston member 46 is sealed with respect to the cylindrical wall 44 by means of an O-ring 48 retained within an annular seal groove 50 formed in the piston or by any other suitable type of circular sealing element. The inner body housing 30 is formed to define an internal groove 52 within which is located a retainer ring 54. The retainer ring, which may conveniently take the form of a split spring metal ring, functions to restrain the piston member 46 at the locking position thereof. The piston member 46 is shown in FIG. 3 at its locking position.

Although a piston is shown in FIG. 3 as the movable partition within the pressure chamber 42, it is not intended to limit the present invention solely to the form shown. It should be borne in mild that the partition within the pressure chamber may conveniently take the form of a pressure responsive diaphragm or any other suitable pressure responsive structure within the spirit and scope of the present invention.

The pressure activated safety device also incorporates an outer housing structure 56 having a generally cylindrical skirt portion 58 defining an internal receptacle within which is received the inner body housing 30 and at least a portion of the support nipple structure 12. The outer housing, in the position shown in FIG. 3, is freely movable relative to the inner body housing 30 and support nipple 12. The outer housing defines an internal retainer groove 60 within which is received a circular retainer element 62 such as a metal split ring or the like which is adapted for engagement with the extremity 64 of the inner body housing to thus prevent inadvertent separation of the outer housing from the inner housing. The outer housing is also linearly movable relative inner housing, however, such linear movement necessitates corresponding linear movement of the partition member 46. The outer body housing defines an internal partition actuating projection 66 having an end surface 68 which is disposed for contact with the piston member 46. Upon linear movement of the outer housing structure 56 the internal projection 66 forces the piston member 46 to move linearly in a direction toward the source of pressure.

In order for the seal between the O-ring sealing member 38 and the transverse wall 32 to be broken, the inner body housing 30 must be at least partially unthreaded from the support nipple 12. Since the outer housing 56 is freely rotatable relative to the inner housing in the position shown in FIG. 3, obviously, the inner body housing 30 cannot be rotated. It is desirable therefore to provide means for rotating the inner body housing upon like rotation of the outer housing 56. Accordingly, the inner body housing is formed to define a plurality of unlocking receptacles 70 at one extremity thereof. The outer body housing is likewise formed to define a plurality of inwardly projecting detents 72 which are correspondingly positioned respective to the receptacles 70. When the outer housing 56 is forced downwardly from the position shown in FIG. 3 the detent members 72 will enter the unlocking receptacles 70. Upon this occurrence, the outer housing then becomes substantially non-rotatable relative to the inner housing 30. Consequently, rotation of the outer housing 56 under this condition causes unthreading of the inner body housing 30 from the upper extremity of the support nipple 12. The dimension of the parts is such that approximately one revolution of inner body housing is required before the sealing element 38 loses its sealing capability.

It is to desirable to ensure that the inner body housing 30 cannot be unthreaded from the support nipple until substantially all of the pressure has been depleted from the pipeline or other pressure vessel. Especially in the case of hazardous gaseous materials such as hydrogen sulfide it is extremely important to insure that the hazardous gaseous material be prevented from being discharged in the atmosphere in any substantial quantity as the closure member is opened. It is also desirable to ensure that workers in charge of the closure opening procedure be capable of efficiently ascertaining the pressure condition within the pipeline or pressure vessel prior to opening of the closure to thus ensure against physical injury by pressure induced forces or injury that might be caused by due to the presence of hazardous materials. For this reason it is highly desirable to provide means for ascertaining the pressure condition of the pipeline or vessel without allowing any hydrogen sulfide or other hazardous gaseous material to escape into the atmosphere during the pressure inspection procedure. These desirable features are efficiently accomplished through utilization of the present invention. The piston member 46 or diaphragm, as the case, may be is of sufficient physical dimension that the pressure induced force acting thereon will be sufficiently great under all but nominally low pressure conditions to preclude linear movement of the housing member 56 to its unlocking position. The piston member may therefore be designed according to the pressure conditions of the pipeline or pressure vessel to develop a force of significant level that manual operation is impossible or exceedingly difficult even at low pressure conditions. This feature ensures that the outer housing 56 is linearly movable to its unlocking position only when the pressure within the pipeline or pressure vessel is nominal or extremely low such as between 0 and 5 P.S.I. If the outer housing 56 is easily moved from its FIG. 3 position to the unlocking position by manually-applied force, the operating personnel are thereby assured that the pressure condition of the pipeline or vessel is sufficiently near zero that the closure member may be opened safely. If the pressure is above this nominal level, then the operating personnel will immediately sense the resistance to movement of the outer housing. After pressure within the pressure chamber 42 has depleted to the extent that manual linear movement of the outer housing may be accomplished, thus moving the piston 46 toward support nipple 12, the piston 46 will yield quite readily and the internally-projecting detents 72 of the outer housing will move into registering engagement within the respective receptacles 70. Thereafter, simple rotation of the outer housing will unthread the inner housing structure 30 from the upper extremity of the support nipple. The outer housing 56 is provided with a plurality of projecting lugs 74 to enable the operating personnel to accomplish manual unthreading of the inner body housing from the support nipple. As the inner body housing is unthreaded approximately one revolution, one threading rotation will unseat the sealing member 38 from its sealing engagement with the transverse wall structure 32. If any residual pressure remains within the pipeline or pressure vessel it will be vented through the vent passages 40. In the event the gaseous material being vented is of hazardous nature, the worker will immediately detect its presence by the hissing noise that will be developed as the material is being vented through the passages 40. On such occasion, the outer housing would simply be rotated in the proper direction to reseat the sealing member against the transverse wall 32. This is simply an additional safety measure in the event the gaseous material is of an especially dangerous nature.

The worker will then completely unthread the inner body structure 30 from the support nipple 12 thus removing the inner body and the outer housing 56 as a unit. The retainer member 62 will prevent inadvertent separation of the inner and outer housing structures. Thereafter, the closure member 16 may be rotated since the transversely-extending interference block or arms 18 will pass above the projecting extremity of the support nipple 12. The closure member may therefore be removed and subsequently reinstalled.

After the closure member has been repositioned as shown in FIGS. 1 and 2 the inner and outer housing assembly will simply be positioned on the support nipple 12. Since there will be no pressure within the chamber 42 under this condition, the detent members 72 will be easily positioned within the detent receptacles. Thereafter, manual rotation of the outer housing will cause consequent rotation of the inner housing 30 thereby making up the threads between the inner housing and the upper free extremity of the support nipple 12. The inner housing 30 will simply be tightened onto the free extremity of the support nipple sufficiently to bring the sealing member 38 into sealing engagement with the transversely-extending wall 32. Thereafter, repressurization of the pressure containing vessel will cause pressuring energized movement of the piston member in a direction away from the support nipple. The pressure energized piston shifts the outer housing to the locking position as shown in FIG. 3 thereby preventing subsequent movement of the closure until the pressure has again been dissipated.

In view of the foregoing, it is thus readily apparent that the present invention provides a novel pressure activated safety device that effectively prevents opening of the closure of a pipeline or other pressure vessel under circumstances where the pressure vessel is maintained under any significant pressure. Further, the present invention provides an efficient means for insuring protection of workers from being subjected to a contaminated environment such as under circumstances where the pipeline or pressure vessel contains a hazardous material such as hydrogen sulfide or the like. Through utilization of the present invention the outer housing structure may be positioned at its unlocking position for unlocking rotation of the inner housing structure only under circumstances where the pressure within the pipeline or pressure containing vessel is below a designed pressure condition depending upon the circumstances involved. It is therefore seen that the present invention is one well adapted to attain all of the obvious advantages and features hereinabove set forth together with other features which are inherent in the apparatus itself.

Having thus explained my invention in detail, I claim:

1. A pressure activated safety device for mechanical objects, comprising:
    (a) body means being positioned to restrict movement of a mechanical object and being formed to define a pressure chamber in communication with a source of pressure, said body means further having releasable seal means normally preventing communication of said pressure chamber and the atmosphere;
    (b) partition means being movably disposed within said pressure chamber and being positionable at a locking position responsive to pressure within said pressure chamber, said partition means being manually movable from said locking position only upon the occurrence of a negligible pressure condition within said pressure chamber; and
    (c) unlocking means being movably positioned relative to said body and being engagable with said partition means, said unlocking means being manually movable to an unlocking position only upon movement of said partition means from said locking position by said seal releasing means and at said unlocking position said unlocking means being manually manipulatable to alter said body means thus permitting movement of said mechanical object.

2. A pressure activated safety device as recited in claim 1, wherein said body means comprises:
    (a) a body support section for attachment to a mechanical object; and
    (b) a housing section being in assembly with said body support section and being separable from said body support section, said housing section cooperating with said body support section to define a pressure transmitting passage establishing said communication between said pressure chamber and said source of pressure.

3. A pressure activated safety device as recited in claim 2, wherein:
    seal means establishes a sealed relation between said body support section and said housing section, said sealed relation being broken upon predetermined relative movement of said body support section and said housing section.

4. A pressure activated safety device as recited in claim 3, wherein:
    vent means is defined by said housing section and communicates said passage means with the atmosphere upon unsealing of said seal means.

5. A pressure activated safety device as recited in claim 1, wherein:
    (a) said mechanical device is a closure for a pressure containing vessel, said closure having an interference arm extending therefrom; and
    (b) said body means being normally positioned for engagement with said interference arm to block rotation of said closure and thus prevent opening thereof.

6. A pressure activated safety device as recited in claim 1, wherein said body means includes:
    (a) outer housing means having a portion thereof positioned in contacting relation with said partition means and being positionable at a locking position and an unlocking position;
    (b) said partition means being responsive to pressure communicated from said source to maintain said outer housing means at said locking position; and
    (c) upon depletion of the pressure of said source to a predetermined level, said partition means being manually movable to said unlocking position.

7. A pressure activated safety device as recited in claim 6, wherein said body means further includes:
    (a) a body support section for attachment to a mechanical object;
    (b) a housing section being in assembly with said body support section and being separable from said body support section, said housing section cooperating with said body support section to define a pressure transmitting passage establishing said communication between said pressure chamber and said source of pressure; and
    (c) said outer housing section establishing a driving relation with said housing section upon movement thereof to said unlocking position.

8. A pressure activated safety device as recited in claim 7, wherein said partition means comprises:
    (a) a free floating piston being movably positioned within said pressure chamber and being in sealed relation with said housing section; and
    (b) said outer housing means defining projection means positioned for engagement with and movement of said piston upon movement of said outer housing means from said locking position toward said unlocking position.

9. A pressure activated safety device as recited in claim 2, wherein:
    said body support section is of sufficiently limited length as to permit movement of said mechanical object after separation of said housing section therefrom.

10. A pressure activated safety device as recited in claim 9, wherein:

said body support section and said housing section are disposed in threaded assembly and are separable to reduce the length of said body means, said body support section and said body section being separable only upon movement of said unlocking means to said unlocking position.

11. A pressure activated safety device as recited in claim 10, wherein said body means further includes:
(a) outer housing means having a portion thereof positioned in contacting relation with said partition means and being positionable at a locking position and an unlocking position;
(b) said partition means being responsive to pressure communicated from said source to maintain said outer housing means at said locking position; and
(c) upon depletion of the pressure of said source to a predetermined level, said partition means being manually movable to said unlocking position.

12. A pressure activated safety device as recited in claim 6, wherein:
(a) said body section defines drive receptacle means; and
(b) said outer housing means defines drive detent means establishing nonrotatable driving relation with said drive receptacle means upon movement of said outer housing means to said unlocking position.

13. A pressure activated safety device as recited in claim 6, wherein:
retainer means secures said housing means within said outer housing means, whereby said housing means and outer housing means are in unitary assembly upon separation of said housing means from said body support section.

14. A pressure activated safety device for the closures of pressure containing vessels which are opened and closed by rotary movement, comprising:
(a) a body support element for attachment to said vessel adjacent said closure, said body support element defining a pressure transmitting passage in communication with said pressure containing vessel;
(b) a housing element being seaprately connected to said body support element and defining a pressure chamber in communication with said pressure transmitting passage;
(c) a partition element being movably disposed within said pressure chambers and being urged by pressure to a locking position, said partition element being movable by manually induced force to an unlocking position; and
(d) an outer housing element receiving said housing element and being linearly movable relative to said housing element between a locking position and an unlocking position, said outer housing element engaging said partition element and moving said partition element toward said unlocking position upon manual movement of said outer housing toward said unlocking position thereof, said outer housing element establishing a mechanically interlocked relation with said housing element at said unlocking position of said outer housing element, said outer housing element and said partition means being movable to said unlocking position only upon the occurrence of a pressure condition within said pressure vessel and pressure chamber that is of negligible magnitude, at said unlocking position thereof said outer housing section being rotatable to cause speararation of said housing section from said body support section thus permitting rotation of said closure for opening and closing thereof.

15. A pressure activated safety device as recited in claim 14, wherein:
(a) said body support element and said housing element are threadedly interconnected; and
(b) rotation of said outer housing in the unlocking position thereof causes assembly or disassembly of said housing element from said body support element.

16. A pressure activated safety device as recited in claim 15, wherein:
(a) said housing element defines vent passage means; and
(b) seal means establishes sealed engagement between said body support element and said housing element, said sealed engagement being broken upon predetermined relative movement of said body support element and said housing element during said disassembly.

17. A pressure activated safety device as recited in claim 16, wherein:
(a) said housing element defines an internal transverse wall forming a sealing surface;
(b) said body support element defines a circular seal receptacle located about said pressure transmitting passage; and
(c) said seal means being a circular sealing element retained within said seal receptacle and disposed for sealing engagement with said sealing surface, said sealing surface being moved away from said sealing element to break said sealing engagement upon separation movement of said housing element.

18. A pressure activated safety device as recited in claim 14, wherein:
(a) said closure is provided with a projecting arm;
(b) said safety device is positioned in interfering relation with said projecting arm limiting rotation of said closure; and
(c) upon separation of said housing element from said body support element said projecting arm is enabled to pass over said body support element thus permitting opening and closing rotation of said closure.

19. A pressure activated safety device as recited in claim 14, wherein said partition element comprises:
(a) a free floating piston being movably positioned within said pressure chamber and being in sealed rotation with said housing section; and
(b) said outer housing means defining projection means positioned for engagement with and movement of said piston upon movement of said outer housing means from said locking position toward said unlocking position.

20. A pressure vessel having a pressure activated safe closure assembly comprising:
(a) a closure element adapted for rotational assembly and disassembly with a pressure vessel, said closure having a rotation limiting projection extending therefrom;
(b) a pressure activated safety device being located in close proximity to said closure in normally interfering relation with said rotation limiting projection of said closure, said safety device being composed of a support section and a housing section maintained in separatable assembly, upon separation of said housing section from said support section, said support section remaining in position and being of sufficiently limited height as to permit passage of said rotation limiting projection during rotation of said closure; and (c) said safety device being in pressure communication with said vessel and restraining separation of said housing section from said support section as when the pressure of said vessel is above a predetermined negligible level.

* * * * *